Nov. 19, 1963  MASAO IWAKI ET AL  3,111,045
STUD FASTENING METHOD
Filed Feb. 19, 1960  3 Sheets-Sheet 1
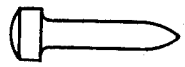
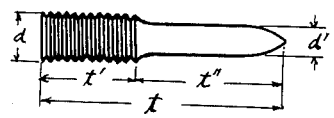
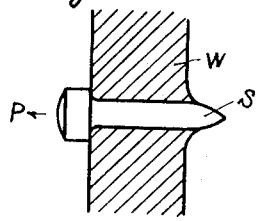
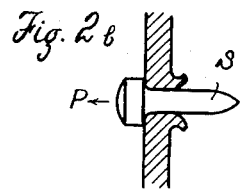
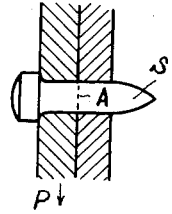
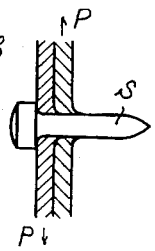
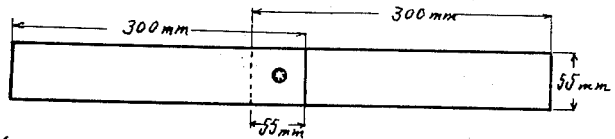
MASAO IWAKI, AND
SABURO KANEKO   Inventors
By Wenderoth, Lind & Ponack
   Attorneys

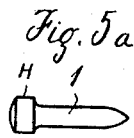 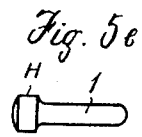 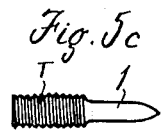 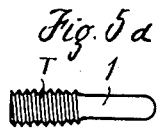
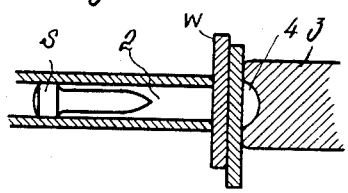 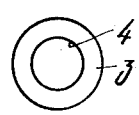
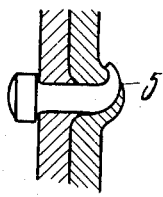 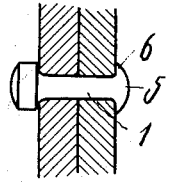
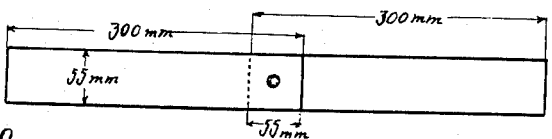

Nov. 19, 1963  MASAO IWAKI ETAL  3,111,045
STUD FASTENING METHOD
Filed Feb. 19, 1960  3 Sheets-Sheet 3

Inventors
MASAO IWAKI, AND
SABURO KANEKO
By Wenderoth, Lind & Ponack
Attorneys

United States Patent Office 3,111,045
Patented Nov. 19, 1963

3,111,045
STUD FASTENING METHOD
Masao Iwaki and Saburo Kaneko, Tokyo, Japan, assignors to Japan Drive-It Co., Ltd., Tokyo, Japan
Filed Feb. 19, 1960, Ser. No. 9,840
Claims priority, application Japan July 29, 1959
1 Claim. (Cl. 78—46)

This invention relates to a novel method of fastening or installing studs, screws, bolts and the like to a structural element which may consist of a single sheet or of two or more sheets to be connected together.

In case of conventional fastening, connecting or bonding metallic elements such as metallic sheets and/or plates together by means of screws, bolts, rivets, studs and the like, holes must be punched, bored or drilled in the elements for the reception of the fastening members such as bolts or rivets or the like. In the manufacture and fabrication of various structures such as the frames of buildings from structural steel, it is essential that the steel beams, bars or other elements must be provided with the accurately located bolt or rivet holes so that it is only necessary to insert the bolts or to apply the rivets and tighten or fasten the materials together. Furthermore, because of errors in the lay-out dimensions or errors in punching, the bolt or rivet holes are sometimes not located in the proper places in the structural elements and they will not fit together. This requires drilling new holes or replacement of elements.

There have been developed stud driving tools or guns for installing studs by explosive action into structural elements without requiring preformed holes on the elements. A number of tools of this type are known and there are a number of registered patents therefor. In general, these tools comprise a tool body, a barrel in said body, a cartridge or explosive charge retainer communicating with the barrel, a firing pin for firing the explosive charge and means for operating the firing pin. In operation, a stud having a sharpened point and which has either a larger diameter head or an externally threaded portion is inserted in the barrel, and a cartridge or explosive charge is charged in place. The muzzle end of the tool body is placed in contact with the surface of the element or work and a firing operation is carried out while the said contact is maintained. The stud is driven by explosive action to pierce or penetrate the element or work and be fastened thereto. While this method is very useful in fastening structures of thick, heavy gauge and for hard materials, difficulties are encountered where the structure is composed of relatively thin, light gauge and for soft materials as will be explained in detail hereinlater.

It is the general purpose and object of the present invention to provide a novel method for fastening or securing studs, bolts, screws and the like to structures, particularly those composed of relatively thin or light gauge materials such as light gauge formed steel sheets or those composed of relatively soft materials such as aluminum alloy, for example duralumin, to fasten a plurality of the structures together, without the various drawbacks mentioned above and encountered in the prior art.

Another object of the invention is to provide a method for rigidly securing studs, bolts, screws and the like to a single sheet structure, particularly of relatively thin or light gauge materials such as light gauge formed steel or of relatively soft materials such as duralumin.

The above and other objects of the present invention will become apparent from the following description made with reference to the accompanying drawings in which:

FIGURES 1a and 1b are side elevations respectively of a headed stud and threaded stud used in conventional explosive stud driving tools.

FIGURES 2a and 2b are sectional views respectively of a thick plate and a thin plate penetrated with a headed stud driven by conventional explosive stud driving tools.

FIGURES 3a and 3b are sectional views respectively of double plates each being relatively thick and double plate each being relatively thin, and both penetrated by a headed stud driven by conventional explosive stud driving tools.

FIGURE 4a is a plan view of two superposed sheets bonded together by a threaded stud penetrating them by being driven in the conventional explosive stud driving method.

FIGURE 4b is a longitudinal section taken along the central longitudinal line including the stud, of FIGURE 4a.

FIGURE 4c is a view similar to FIG. 4b but showing the state where the sheets have shearing loads applied thereto in the opposite directions indicated with the arrows.

FIGURES 5a, 5b, 5c and 5d are side elevations, each illustrating a stud which may be used in the present invention.

FIGURE 6 is a schematic longitudinal section of the muzzle and cooperating die of a tool according to this invention, with two steel sheets clamped therebetween.

FIGURE 7 illustrates the die as viewed from the left in FIGURE 6.

FIGURES 8a and 8b illustrate the headed stud secured to two light gauge steel sheets to fasten them together according to this invention.

FIGURES 9a, 9b and 9c are views similar respectively to FIGURES 4a, 4b and 4c, but showing those where a threaded stud secured according to this invention is used.

Figure 10:
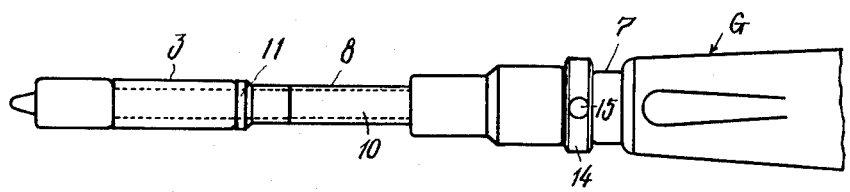
FIGURE 10 is a plan view of a stud driving tool embodying the present invention, the body of the tool being omitted because it may be of any conventional type and does not constitute feature of the invention.

As described hereinbefore, while the explosive stud driving method recently developed is very useful in fastening structures, one of its most serious defects is in the well known fact that a satisfactory rigid connection is obtained only where the structures have considerable thickness and that this method cannot be applied to those cases where the structures to be fastened together or to which the stud is to be secured are composed of relatively thin, light gauge and/or soft materials.

In such a conventional explosive stud driving method and tool, a headed or externally threaded stud typically shown in FIGS. 1a and 1b is used. When such stud S is driven into a thick steel plate W as shown in FIG. 2a the material mass around the stud is slightly deformed and compressed producing a bond stress acting on the stud S to rigidly hold the same. Furthermore, since the plate is thick the engagement area between the stud surface and the surrounding material is sufficient to obtain a rigid frictional engagement. Thus the secured stud can withstand a high pull out load P. Whereas, when the plate is thin, the deformation of the material of the sheet exceeds its elastic limit as well shown in FIG. 2a so that little bond stress acting on the stud S is obtained. Furthermore, because of the fact that the sheet is thin, frictional engagement between the stud surface and the surrounding material is small. Thus, the secured stud S can withstand only a low pull put load P (FIG. 2a).

Studs of various dimensions were explosively driven through and anchored to steel sheets of various thickness by the conventional explosive stud driving method, and the tensile strength of the stud and the pull out load of the secured stud in each case was measured. The result is shown in the following Table I.

*Table I*

| Stud | Tensile Strength of stud T, kg. | Thickness of Steel plate, mm. | Pull out load P, kg. | P/T (percent) |
|---|---|---|---|---|
| S-1 | 2,200 | 3.2 | 160 | 7.3 |
| S-1 | 2,200 | 6.4 | 958 | 43.0 |
| S-1 | 2,200 | 9.5 | 1,202 | 55.0 |
| S-2 | 5,035 | 3.2 | 242 | 4.8 |
| S-2 | 5,035 | 6.4 | 2,375 | 47.0 |
| S-2 | 5,035 | 9.5 | 3,078 | 61.0 |
| S-2 | 5,035 | 12.5 | 4,030 | 80.0 |
| S-2 | 5,035 | 15.8 | 4,638 | 92.0 |

Remarks: In the above Table I, the stud S-1 is that shown in FIG. 1b in which d is 6.3 mm., d' is 4.4 mm., t' is 15 mm., t'' is 15 mm. and t is 30 mm., while the stud S-2 is that shown in FIG. 1b in which d is 9.5 mm., d' is 6.3 mm., t' is 20 mm., t'' is 30 mm. and t is 50 mm.

As is seen from the above experimental data of Table I, while the stud S-1 driven in 3.2 mm. sheet is pulled out with a load only about 5% of its tensile strength, the same stud S-1 driven in 9.5 mm. plate is not pulled out with load up to about 55% of its own tensile strength. Similarly, the stud S-2 secured to 15.8 mm. steel plate is not pulled out until loaded with about 90% or more of its own tensile strength; but the same stud S-2 secured to 3.2 mm. steel sheet is pulled out with a load only about 5% or less of its own tensile strength. Obviously, when the steel material is less than 3.2 mm. in thickness the pulling load is sharply lowered.

When a pair of superposed relatively thick steel plates (say 10-15 mm. in thickness) are bonded together by a stud driven by a conventional explosive stud driving method and shearing force P is applied to each of the plates in opposite directions as shown in FIG. 3a, it has been found that the stud shears along the plane A. This means that the bond is strong and approximately equals the shearing force of the stud itself. In contrast thereto, when a pair of thin (3.2 mm. thickness) steel sheets are bonded in the same manner, FIG. 3, and shearing force P is similarly applied, the penetrated portion of the sheets is deformed due to the existence of the stud and the hole is enlarged, so that one of the sheets is disconnected from the stud before the stud shears, as schematically illustrated in FIGS. 4a, 4b and 4c. In the case shown, the before mentioned stud S-1 having shearing force of about 1,110 kg. was used and the said disconnection (FIG. 4c) occurred when a shearing load of only about 700 kg. was applied to the sheets.

For these reasons, it is well known in the art that the conventional explosive stud driving method is not applicable to thin or light gauge steel material (for example, about 5 mm. or less in thickness) to achieve a rigid connection or rigid stud mounting. In practice, application of the conventional explosive stud driving method has been limited to steel plates of at least ¼" and preferably ⅜"-½" or more in thickness to achieve a rigid connection. Thus, this is a serious disadvantage of the known explosive stud driving method, particularly in view of the recent increasing use of the so-called light gauge (formed) steel structural elements in the field of construction and other industries, said light gauge steel, in general, being 5 mm. or less in thickness.

Similar disadvantages of weakness in bonding are encountered in driving studs in relatively soft structural materials such as duralumin by the conventional explosive stud driving method.

The present invention eliminates all these drawbacks. According to the present invention, studs having configurations similar to those of known studs used in the conventional explosive stud driving method may be used, FIGS. 5a and 5c. However, when the material of the structure to which the stud is to be secured is relatively soft such as an Al-alloy, e.g. duralumin, the stud may have a rounded or conical top as illustrated in FIGS. 5b and 5d. The dimensions and shape of studs may vary depending upon the application and upon the thickness and materials of the structure to which the studs are to be secured. It is essential, however, that the stud S has a head H or externally threaded portion T whose diameter is larger than that of the shank 1. It has been found that a stud of 6-9 mm. in the head (or threaded portion) diameter, 4-5 mm. in shank diameter and 10-25 mm. in shank length is satisfactory although the dimensions are not limited thereto. The material of the stud may also vary depending upon the thickness and material of the structure to which the stud is to be secured, but it is essential that the material of the stud is such that, when driven into the structure at high velocity, the stud can penetrate the structure and the portion of the stud exposed on the opposite side of the structure can be deformed by a die to flow to take a desired shape determined by the die. Generally, the stud is made of plain carbon steel or special alloy steel such as Mo steel, Cr—Mo steel, Ni—Cr—Mo steel with a C content of about 0.30-0.45%. It will be understood, however, that the stud may be made of various softer materials when the structure is composed of relatively soft material such as Al-alloy, for example duralumin. It has been found that when the structure is a single or multiple sheets each of which is an ordinary light gauge steel (soft or mild steel) of 1.0 to 5.0 mm. in thickness, studs having Rockwell hardness ("C" scale) of about 40±5 are satisfactory. If the Rockwell hardness value is below about 20, the stud will not readily penetrate the structure, while if the value is higher than about 50 the stud will be difficult to deform to the desired shape by the die after penetration of the structure, and furthermore there is danger that the stud may be broken by impact or bending.

Any suitable conventional stud driving tool which is adapted to drive a stud to penetrate the structure at high velocity while the muzzle is in engagement with the surface of the structure may be utilized in carrying out the method of this invention. Thus, compressed air operated rivetter type tools and conventional explosive stud driving tools or guns can be used, the latter being preferred, however. The distinctive feature of this invention is to use a die member in cooperation with such stud driving tool. The die and the muzzle of the driving tool are so arranged that the structure into which a stud driven from the tool is to be secured is releasably clamped therebetween and that the recess on the die is substantially coaxial with or slightly eccentric from the barrel of the tool. A typical relation of the associated elements concerned is schematically illustrated in FIG. 6, wherein there is indicated with the numeral 2 the muzzle or forward end portion of the barrel of the stud driving tool (not shown), and 3 is a die in which is provided a recess 4. Between the muzzle 2 and the die 3, a work, for example two light gauge steel sheets W, W' as shown, is tightly clamped. When the stud S is driven from the tool for example by explosive action into the work W under this condition (FIG. 6), the stud S penetrates the work and its top portion is exposed or projected through the opposite side of the work W''. The amount of the portion of the stud to project out of the opposite side of the particular work or structure can be predetermined by the particular stud to be used. The volume of the recess 4 on the die 3 may be so designed as to be substantially equal to that of the exposed portion of the stud (FIG. 8b) or to that of the exposed portion of the stud plus the protruded portion of the work (FIG. 8a). It has been found that a satisfactory result is obtained according to this invention when the length of shank of a stud or the length of the stud excepting the head or externally threaded portion is so selected as to be, for example, about 8 to 12 mm. plus the thickness of the structure (single or multiple sheets). This means that the stud projects out of the opposite surface of the structure by about 8 to 12 mm. in length.

The portion projecting out of the opposite face of the structure is deformed to follow the shape of the recess 4 of the die 3. A typical result is illustrated schematically in FIGS. 8b. By suitably selecting the material and/or shape of stud and/or shape or positioning of the recess relative to the muzzle, a result somewhat as schematically shown in FIG. 8a is obtained, particularly when the recess 4 is slightly eccentric from the muzzle. This is not objectionable, but rather preferable so far as bonding strength is concerned because the stud end portions hold the plates tightly between them while the material of the plate which is deformed outwardly as the stud comes through the plate is deformed to at least partially overlie the deformed end 5 of the stud.

As will be understood the die 3 as a whole or at least at the surface of the recess 4 must be hard enough not to be damaged by the stud and to ensure the required deformation of the projecting or exposed portion of the stud. It is preferable to use a carburized carbon steel 2 special steel containing Ni, Cr, Mo, etc. which is harder than the stud to be employed, as the material for the die.

The shape of the recess 4 may vary as desired so far as the required deformation of the stud end can be accomplished thereby, but practically it is preferable to take a conventional rivet-head-like shape 5 as shown. It is required however that the shape of the recess be such that the portion deformed thereby has a base 6 which is larger in the lateral dimension or in diameter than the shank 1 of the stud and which firmly engages with the opposite face of the structure. In other words, the diameter or dimension of the recess 4 as taken along the surface of the die 3 should be larger than the diameter of the shank of the stud to be used.

A distinctive advantage of the present invention lies in the fact that an extremely rigid bonding is accomplished even when the structure is relatively thin. Thus the present invention is most useful for light gauge steel structures to which the conventional explosive stud driving method has been not applicable. Therefore, effect of the present invention as applied to light gauge steel will be described hereinbelow.

Into a light gauge (or mild) steel sheet (55 mm. x 55 mm.) of 3.2 mm. in thickness was driven and secured the beforementioned stud S–1 (refer to Remarks below Table I) by the usual explosive stud driving tool. When a gradually and evenly increasing pull out load was applied to the stud, it slipped out of the sheet at a load of 160 kg. Into the same light gauge sheet was driven and secured the same stud S–1 by the same driving tool but associated with a die in accordance with the teaching of the present invention, and the stud withstood a pull out load of 850 kg. at which the stud did not slip out of the sheet but was broken at the shank. It will be seen from this test that the pull out resistance obtainable in the present invention is approximately 5 times that obtainable in the conventional explosive stud driving method, when applied to a light gauge steel sheet. While in the above mentioned test carried out under the present invention the stud (44 mm. in diameter) was broken, the steel sheet would be damaged before the stud is broken if the stud's diameter is increased, for example up to 5.5 mm.

Further tests as to pull out strength were carried out by driving a headed stud (as shown in FIG. 5a) into various light gauge steel sheets using an explosive driving tool associated with a die in accordance with the invention. The result is as shown in the following Table II. The shank diameter of the studs was 4.4 mm. while their length was varied depending upon the total thickness of the sheet(s).

Table II

| Thickness of Sheet (mm.) | Number of Sheets | Pull Out Resistance (kg.) | | | | Pull Out Resistance, Average, kg. |
|---|---|---|---|---|---|---|
| 4.5 | 1 | 1,720 | 1,180 | 1,360 | 1,310 | 1,393 |
| 3.2 | 1 | 740 | 880 | 950 | 995 | 891 |
| 3.2 | 2 | 1,570 | 1,505 | 1,525 | 1,520 | 1,530 |
| 3.2 | 3 | 1,610 | 1,720 | 1,380 | 1,780 | 1,623 |
| 2.3 | 1 | 770 | 725 | 666 | 666 | 707 |
| 1.6 | 1 | 430 | 370 | 415 | 390 | 401 |
| 1.6 | 2 | 770 | 966 | 740 | 735 | 803 |
| 1.6 | 3 | 1,010 | 930 | 1,275 | 1,080 | 1,074 |

To compare shear strength obtainable according to this invention with that of a conventional explosive stud driving method, the test as described before with reference to FIGS. 4a, 4b and 4c was repeated except that a die was associated with the muzzle and engaged with the opposite face of the structure in accordance with the present invention. When gradually increasing shearing force P was applied disconnection occurred at a shearing force of 1250 kg., under which load the stud was broken (refer to FIGS. 9a, 9b and 9c) in sharp contrast to the conventional connection previously shown and described in respect of FIGS. 4a, 4b and 4c where the shear strength was only 700 kg.

It will be appreciated that by deforming the portion projecting through the opposite face of the structure into a rivet-head-like shape 5 by the use of a die 3 in cooperation with a stud driving tool, a joint or bonding more rigid than ones obtained by a conventional stud driving method is produced. In addition to the effect of a rigid joint or bonding, the deformed stud top portion is neat and smooth in appearance. The present invention is applicable not only to join a plurality of structural members together by a stud but also to install or secure a stud, particularly an externally threaded bolt on to a single structural member. Although the present invention is useful particularly when applied to relatively thin metallic structure such as light gauge steel sheet of 1.0 to 5.0 in thickness, it is not limited thereto and is broadly applicable to those cases where conventional stud driving tools such as explosive stud driving tools have been used. Another important advantage of the present invention is that it may be useful for securing or installing studs to relatively soft structure such as of Al-alloy, for example duralumin, to which the conventional explosive stud driving method has been not applicable. It will be understood that because of the deformed rivet head shaped stud top portion 5 the stud will not slip out of the structure even when the structure is composed of relatively soft material.

Any conventional stud driving tool by which a stud can be driven at high velocity and secured to structure without any preformed hole on the structure may be utilized in carrying out the present invention, except the requirement that the die 3 must be used in cooperaiton with the driving tool. The die 3 and the muzzle 2 should be so arranged that structure may be releasably but firmly clamped therebetween and the recess 4 on the die 3 is substantially coaxial with or slightly eccentric from the muzzle 2. A conventional explosive stud driving tool or gun whose structure and operation have been briefly explained hereinbefore and which are very well known in the act is preferred in the invention.

Figure 11:
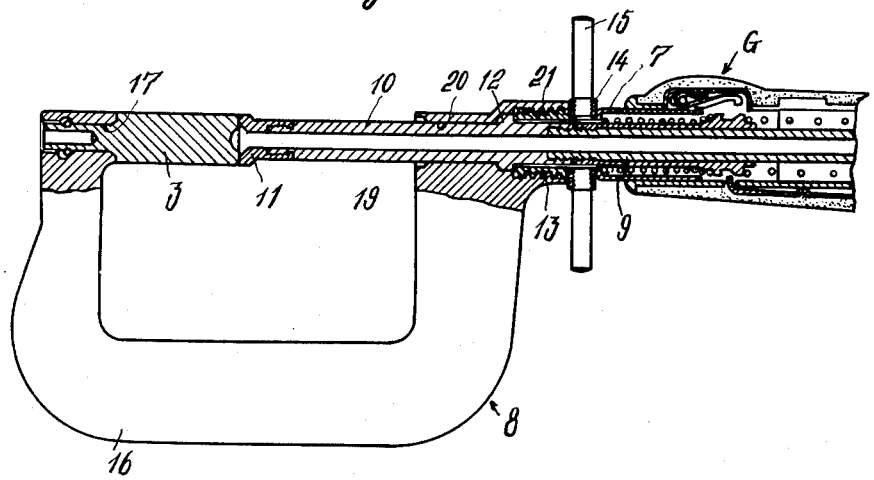
FIGURE 11 is a side elevation, partly in section, of the tool shown in FIGURE 10.
Figure 12:
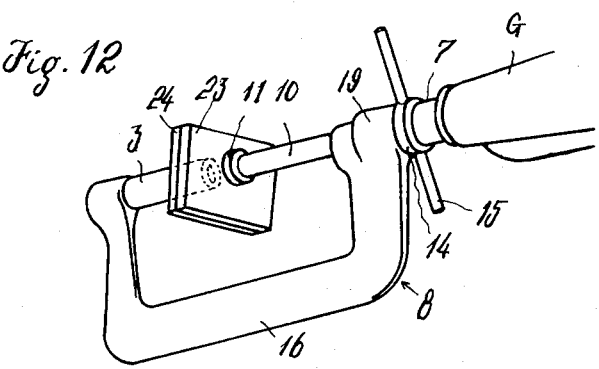
FIGURE 12 is a perspective view of the tool shown in FIGURES 10 and 11.

FIGS. 10, 11 and 12 show a preferred explosive stud driving tool with associated die for carrying out the method of the present invention. Briefly stated, a separate attachment generally indicated by the numeral 8 is adapted to be detachably mounted on the forward end portion of the barrel 9. A muzzle member 11 is removably secured to the forward end of the second barrel 10. The second barrel 10 has a slight annular projecting flange 12 spaced from the forward end of the sleeve 7. In said space, a sleeve 13 having an externally threaded portion and an annular flange 14 is loosely or rotatably mounted on the barrel 10. Longitudinal or axial movement of the sleeve 13 is prevented by the flange 12. An operating lever 15 is secured to the flange 14.

A U-shaped bar or arm 16 has at its forward end a socket 17 for firmly holding a die member 3 which is substantially in alignment or coaxial with the second barrel 10 which in turn is in alignment or coaxial with the first or gun barrel 9. At the other end of the arm 16 is an enlarged portion 19 adapted to be mounted on the second barrel 10. The enlarged portion 19 has a bore 20 the wall of which is slidably fitted on the external surface of the second barrel 10. The enlarged portion 19 has also an internally threaded counterbore 21. The thread on the counterbore 21 is engaged with the external thread on the sleeve 13. The arrangement is such that when the operating lever 15 and hence the sleeve 13 is rotated in one direction the enlarged portion 19 and hence the arm 16 as a whole is moved in one direction or to the left as viewed in FIG. 11, while when the lever 15 is rotated in the opposite direction the arm 16 is moved in another direction or to the right. Since the second barrel 10 and the muzzle member 11 are stationary, it will be understood that the die 3 can be moved toward or away from the muzzle 11 by operating the lever 15. The recess 4 is formed on the face of the die member 3 and is arranged substantially coaxial with or slightly eccentric from the barrel as mentioned before.

In operating the tool starting from the position shown in FIGS. 10 and 11 where the die 3 is in contact with the muzzle 11, the lever 15 is first rotated to one direction so as to move the die 3 away from the muzzle 11 until a space is formed therebetween sufficient for receiving a structure such as two steel sheets 23, 24 which are desired to be bonded together. After insertion of the structure therebetween, the lever 15 is rotated in the reverse direction so as to move the die 3 toward the muzzle 11 until the structure is firmly clamped thereby as well shown in FIG. 12. Thereafter, a stud driving operation which is the same as for a conventional explosive stud driving gun or tool is carried out. Namely, a stud is inserted in the barrel and an explosive charge or cartridge is installed. A safety device is released and a firing pin is operated to fire the cartridge so as to drive the stud by explosive action. Since the mechanism and operation of such explosive driving tool is quite commonly known to those skilled in the art it would be unnecessary to show the same in detail in the drawings and to explain it further. While the invention has been described and shown in respect of some particular embodiments, it should be understood that the invention is not limited to these embodiments and various changes, modifications and alternations are possible within the scope of the present invention.

We claim:

A method of fastening a stud having a shank portion and a top portion with a diameter larger than the shank portion and part of the same piece of material as the shank portion to a structure having a thickness which is relatively small in relation to the diameter of the stud, comprising the steps of placing the nozzle end of the barrel of an explosive stud driving tool in engagement with the surface of the structure, operating the stud driving tool to drive the stud through the structure at high velocity so as to cause a portion of the stud to penetrate the structure and the leading end of the stud to extend through the opposite face of the structure from the face against which the explosive stud driving tool is placed and deform the said material at the opposite face of the structure outwardly of the structure, and deflecting the leading end of the stud as it penetrates through said opposite face to turn it laterally in one direction from the direction in which it is coming through the said opposite face of the structure to cause it to bear against the surface of the said opposite face and at the same time deforming the material at the opposite face of the structure which is deformed outwardly by the penetration of the stud through the opposite face to at least partially overlie the deformed end of the stud which has penetrated the opposite face for securely positioning the stud in the structure and increasing the force which is necessary for separating the stud and the structure.

References Cited in the file of this patent

UNITED STATES PATENTS

| | | |
|---|---|---|
| 908,243 | Gminder | Dec. 29, 1908 |
| 1,003,154 | Scott | Sept. 12, 1911 |
| 1,365,870 | Temple | Jan. 18, 1921 |
| 1,834,221 | Robinson | Dec. 1, 1931 |
| 1,846,116 | Kerns | Feb. 23, 1932 |
| 2,045,333 | Pipes | June 23, 1936 |
| 2,050,047 | Febrey | Aug. 4, 1936 |
| 2,096,002 | Moreira | Oct. 19, 1937 |
| 2,202,125 | Temple | May 28, 1940 |
| 2,276,259 | Temple | Mar. 10, 1942 |
| 2,316,112 | Temple | Apr. 6, 1943 |
| 2,590,585 | Temple | Mar. 25, 1952 |

FOREIGN PATENTS

| | | |
|---|---|---|
| 474,368 | Great Britain | Nov. 1, 1937 |